(12) United States Patent
Herrada

(10) Patent No.: US 11,548,475 B2
(45) Date of Patent: Jan. 10, 2023

(54) GEAR MOTOR FOR MOTOR VEHICLE WIPING SYSTEM

(71) Applicant: Valeo Systèmes d'Essuyage, Le Mesnil Saint Denis (FR)

(72) Inventor: Jose-Luis Herrada, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 75 days.

(21) Appl. No.: 16/618,609

(22) PCT Filed: May 11, 2018

(86) PCT No.: PCT/EP2018/062216
§ 371 (c)(1),
(2) Date: Dec. 2, 2019

(87) PCT Pub. No.: WO2018/219620
PCT Pub. Date: Dec. 6, 2018

(65) Prior Publication Data
US 2020/0180564 A1 Jun. 11, 2020

(30) Foreign Application Priority Data
Jun. 2, 2017 (FR) ........................................ 1754891

(51) Int. Cl.
*B60S 1/26* (2006.01)
*B60S 1/08* (2006.01)
*B60S 1/34* (2006.01)

(52) U.S. Cl.
CPC . *B60S 1/26* (2013.01); *B60S 1/08* (2013.01); *B60S 1/3479* (2013.01); *B60S 1/3493* (2013.01); *B60S 1/3495* (2013.01)

(58) Field of Classification Search
CPC .. B60S 1/26; B60S 1/08; B60S 1/3479; B60S 1/3493; B60S 1/3495; B60S 1/0822;
(Continued)

(56) References Cited

U.S. PATENT DOCUMENTS

| 7,676,880 B2 * | 3/2010 | Moein | H02K 11/33 |
| | | | 15/250.3 |
| 10,040,426 B2 * | 8/2018 | Kimura | B60S 1/08 |

FOREIGN PATENT DOCUMENTS

| CN | 203135601 U | 8/2013 |
| CN | 203528739 U | 4/2014 |

(Continued)

OTHER PUBLICATIONS

First Office Action issued in corresponding Chinese Patent Application No. 201880036659.9, dated Jan. 5, 2021 (11 pages).
International Search Report and Written Opinion in corresponding International Application No. PCT/2018/062216, dated Jun. 4, 2018 (12 pages).

*Primary Examiner* — Katina N. Henson
(74) *Attorney, Agent, or Firm* — Osha Bergman Watanabe & Burton LLP

(57) ABSTRACT

The system concerns a gear motor for a motor vehicle wiping system comprising:—an electric motor comprising a rotor, a stator and a rotating shaft solidly attached to the rotor,—a reducing mechanism connecting the rotating shaft and an output shaft of the gear motor. According to the invention, a roller bearing (23) guides the rotating shaft (22) at one of the longitudinal ends of the rotating shaft, said roller bearing (23), arranged inside the rotor and stator assembly, housed in an inner recess of the rotor, and in which a hollow support bears the magnetic elements and is arranged coaxially and connected in rotation with the rotating shaft (22), said hollow support (25) covering said roller bearing (23) guiding the longitudinal end of the rotating shaft (20) on the side of the electric motor (2), the axial locking of the roller bearing (23) on the rotating shaft (22)

(Continued)

Figure 1:
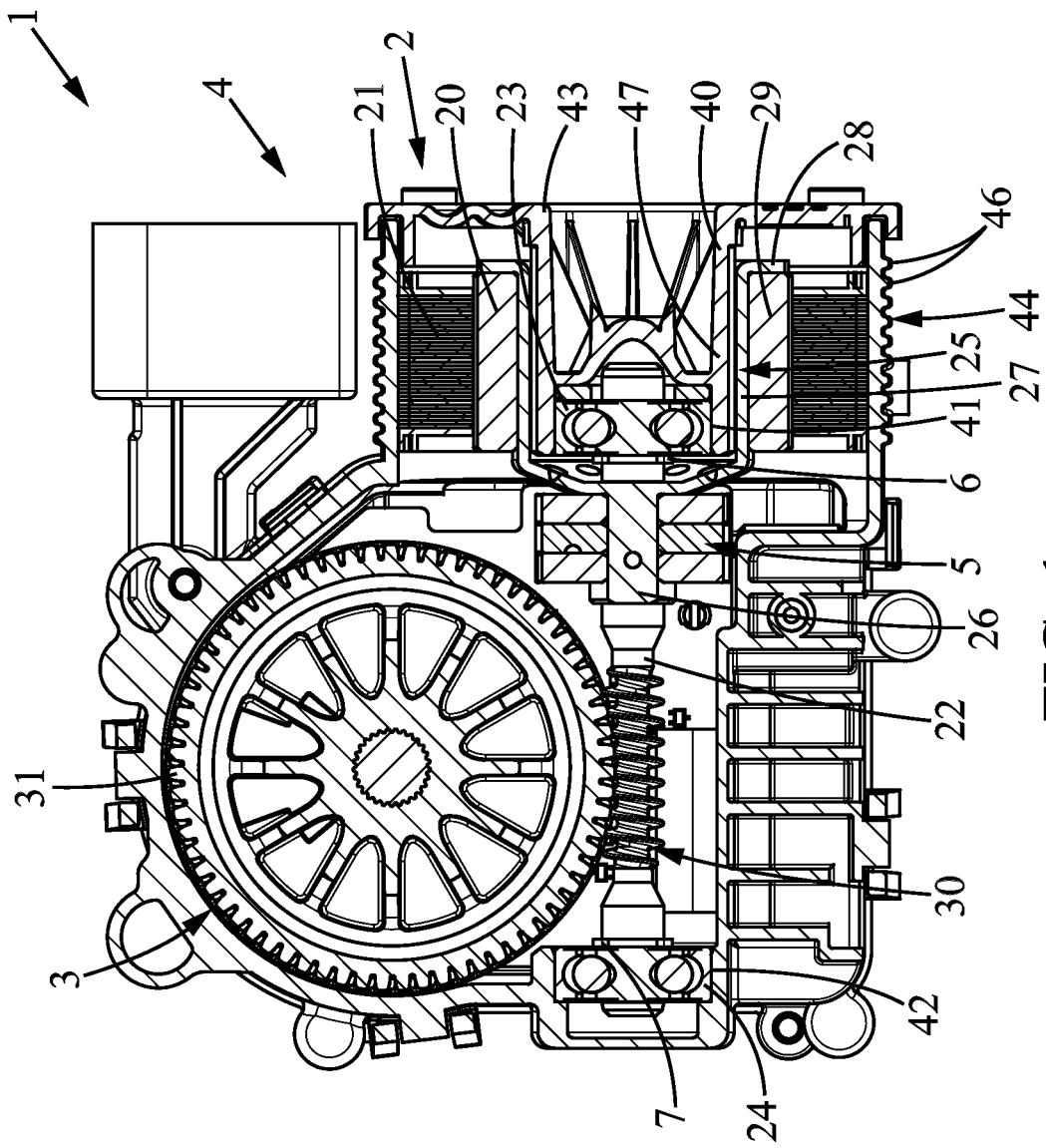

being obtained by pressing against the inner race of the roller bearing (23) on the inner wall of the hollow support (25), directly or indirectly through the intermediary of a spacer (8).

14 Claims, 2 Drawing Sheets

(58) Field of Classification Search
CPC .. H02K 7/14; H02K 21/14; H02P 6/08; H02P 1/04; H02P 1/00; H02P 3/00; H02P 6/00; H02P 23/00; H02P 27/00
USPC .............................. 15/250.003, 250.3, 250.12
See application file for complete search history.

(56) References Cited

FOREIGN PATENT DOCUMENTS

| | | | |
|---|---|---|---|
| CN | 204967491 | U | 1/2016 |
| CN | 106329812 | A | 1/2017 |
| CN | 205882886 | U | 1/2017 |
| CN | 205911911 | U | 1/2017 |
| CN | 106716793 | A | 5/2017 |
| DE | 10 2011 090109 | A1 | 7/2013 |
| JP | 2001-078385 | A | 3/2001 |
| WO | 2016-010023 | A1 | 1/2016 |
| WO | 2016-035358 | A1 | 3/2016 |

\* cited by examiner

GEAR MOTOR FOR MOTOR VEHICLE WIPING SYSTEM

The present invention concerns a gear motor for a motor vehicle wiper system.

Gear motors essentially consist of an electric motor coupled to a reduction gear mechanism responsible for reducing the speed of the latter to obtain a high rotation transmission torque.

Various types of electric motor may be used in a gear motor and in particular brushless DC electric motors, which have numerous advantages such as long service life, small overall size, low energy consumption and low sound levels.

However, control of these electric motors is more complex compared to electric motor with brushes because to enable correct operation it is necessary to know accurately the angular position of the rotor of the brushless DC electric motor.

In fact, electric motors of this kind include electromagnetic excitation windings disposed at the level of the stator and fed alternately via an inverter to enable driving of the rotor.

Now, in order to be able to switch the switches of the inverter (generally six switching operations for each rotation of the rotor) and therefore to be able to supply the electromagnetic windings with power at optimum times to enable optimum required driving of the rotor to be obtained, it is necessary to know the position of the rotor at all times. To this end the position of the rotor and its angular speed are very often determined by processing signals generated by a device that includes a multipole magnet mounted to turn with the rotor and Hall-effect sensors arranged at fixed positions relative to the magnet.

The document WO 2016/010023 discloses a gear motor of the above kind for motor vehicle wiper systems using a brushless DC motor. The brushless motor includes a stator with windings for electromagnetic excitation of the rotor and the rotor is rigidly mounted at the end of a rotation shaft. That rotation shaft extends from a casing part for the rotor/stator combination to a casing part receiving the reduction gear mechanism, which is a worm gear.

The worm of the worm gear is fastened to the rotation shaft of the rotor and meshes with the worm wheel fastened to the output shaft of the gear motor.

Figure 4:
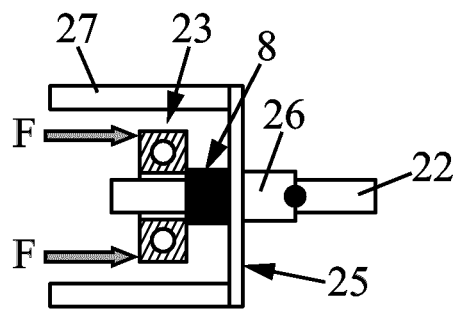

In particular and as can be seen in FIG. 4 (or in FIG. 8) of the document WO 2016/010023, only two ball bearings are used to guide rotation of the rotation shaft of the rotor with, on the one hand, a first ball bearing 39 supporting a central part of the rotation shaft, between the rotor and the worm, and, on the other hand, a second bearing at the longitudinal end of the shaft disposed at the other end of the worm relative to the first bearing.

In particular, the part of the length of the rotation shaft extending from the first bearing to the rotor is guided only by the first bearing, the longitudinal end of the shaft emerging from the other side of the rotor being unguided.

Such guidance by means of only two bearings differs from the usual practice that conventionally uses a third bearing to guide the distal end of the shaft in rotation near the rotor. The inventor has observed that guiding the shaft in this way using only two bearings makes it possible to limit the overall size of the gear motor in the direction of the shaft. On the other hand, the omission of the third bearing is not ideal in terms of mechanical forces, and this shortcoming may cause the appearance of vibrations when the rotor is rotated.

Furthermore, in the prior art, whether the shaft is guided by two bearings or three bearings as cited above, it is still standard practice to provide a bearing at an intermediate position along the length of the rotation shaft, near the worm, and another bearing at the longitudinal end of the shaft at the other end of the worm. Such guidance by positioning the bearing as close as possible to the worm makes it possible to limit flexing of the rotation shaft at the level of this meshing part with the aim of ensuring satisfactory operation of the reduction gear mechanism with no risk of stripping the gears.

In the document WO 2016/010023 the intermediate bearing 39 is disposed near the multipole magnet of the device for determining the position of the rotor. Limiting flexing of the shaft further makes it possible to maintain within acceptable tolerances the radial distance between the multipole magnet and each Hall-effect sensor so as to ensure correct operation of the sensor device.

An aim of the present invention is to alleviate the aforementioned disadvantages by proposing a gear motor for motor vehicle wiper systems in which the motor shaft is guided in a way that makes it possible to achieve good compactness along the longitudinal axis of the rotation shaft without sacrificing the dynamic balancing of the electric motor.

The aim of the present invention is more particularly to propose a gear motor of the above kind in which the axial locking of the bearings onto the rotation shaft can be easily industrialized.

Other aims and advantages of the invention will become apparent in the course of the following description, which is given by way of nonlimiting illustration only.

Thus the invention relates to a gear motor for a motor vehicle wiper system, including:
  an electric motor including:
    a rotor including magnetic elements,
    a stator including windings for electromagnetic excitation of the rotor,
    a rotation shaft fastened to the rotor,
  a reduction mechanism connecting the rotation shaft and
    an output shaft of the gear motor,
  and in which a bearing guides the rotation shaft at one of the longitudinal ends of the rotation shaft, having an outer race and an inner race mounted on the rotation shaft, said bearing, disposed inside the combination of the rotor and the stator, being housed in an internal recess in the rotor, and in which a hollow support carries said magnetic elements and is arranged coaxially with and constrained to rotate with the rotation shaft, said hollow support coming to cap said bearing guiding the longitudinal end of the rotation shaft at the electric motor end, and in which said bearing is received in a fixed seat having a bearing face engaging with the outer race of the bearing, on one side of the bearing, the axial position of the bearing on the rotation shaft being locked by axially locking said hollow support onto the rotation shaft, on the one hand, and by the inner race of the bearing bearing on an internal wall of said hollow support, on the opposite side of the bearing to that engaging with said seat, on the other hand, said inner race of the bearing bearing on the internal wall of said hollow support either directly or indirectly via a spacer inside said hollow support, said spacer bearing on said inner race and the internal wall of the hollow support.

According to optional features of the invention, separately or in combination:
  the inner race of the bearing bears indirectly on the internal wall of said hollow support via said spacer, said spacer being a tubular element through which the rotation shaft passes;

the axial locking of said hollow support onto the rotation shaft is obtained by welding said hollow support onto the rotation shaft;

the axial locking of said hollow support onto the rotation shaft is produced by an elastic ring received in a groove in the rotation shaft and bearing on the hollow support either directly or indirectly via a spacing part, said elastic ring constituting an abutment for said hollow support opposing movement of said hollow support away from said seat;

the axial locking of said hollow support onto the rotation shaft is produced by a bead bearing on the hollow support either directly or indirectly via a spacing part, said bead being in one piece with the rotation shaft and constituting an abutment for said hollow support opposing movement of said hollow support away from said seat;

the hollow support is shrunk onto the rotation shaft;

a device for determining the angular position of the rotor includes a multipole magnet constrained to rotate with the rotor and one or more Hall-effect sensors and in which the axial locking of said hollow support onto the rotation shaft is produced by axially locking said multipole magnet onto the rotation shaft and by said hollow support bearing on said multipole magnet, said multipole magnet constituting an abutment for said hollow support opposing movement of said hollow support away from said seat;

the axial locking of the multipole magnet onto the rotation shaft is produced by an elastic ring received in a groove in the rotation shaft or by the formation of a bead in one piece with the rotation shaft, said elastic ring or the bead constituting an abutment for said multipole magnet opposing movement of said hollow support away from said seat;

the axial locking of the multipole magnet onto the rotation shaft is produced by welding said multipole magnet onto the rotation shaft or by shrinking said multipole magnet onto the rotation shaft;

said hollow support extends axially beyond the electric motor longitudinal end of the rotation shaft;

a casing forming a protective envelope for the electric motor and said reduction gear mechanism, said envelope of the casing includes a part projecting inward, penetrating into said internal recess in the rotor, and supporting said seat for said bearing, and in which said hollow support comes to cap said projecting part of the casing;

the rotation shaft is guided in rotation only by two bearings arranged at the two longitudinal ends of the rotation shaft, including said bearing capped by said hollow support and another bearing at the other, reducing mechanism longitudinal end of the rotation shaft.

According to one embodiment, the hollow support includes:

a sleeve for fixing the hollow support onto the rotation shaft in an intermediate position on the shaft between the reduction gear mechanism and the bearing guiding the electric motor longitudinal end of the rotation shaft, a substantially cylindrical support length section to the circumference of which the magnetic elements of the rotor are fastened, a connection length section connecting the sleeve and said cylindrical support length section.

According to one embodiment, the inner race of the bearing bears directly on the internal wall of said hollow support consisting of said connection length section connecting the sleeve and said cylindrical support length section, said connection length section being formed so as not to touch the outer race of said bearing.

According to one embodiment, the sleeve, said substantially cylindrical support length section, and said connection length section connecting the sleeve and said cylindrical support length section consist of a one-piece element such as a shaped sheet metal plate.

Figure 2:
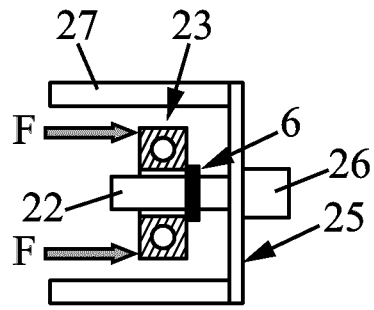
Figure 3:
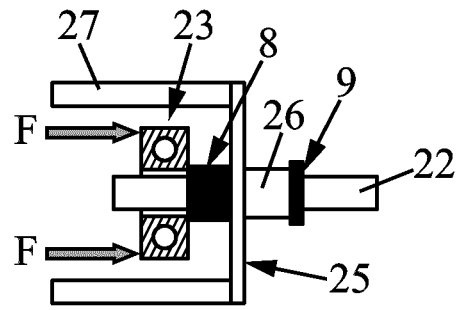
Figure 5:
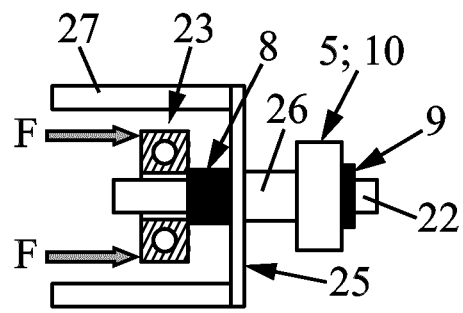
Figure 6:
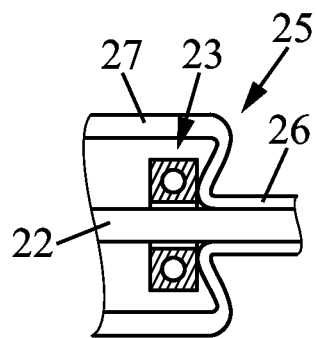

The invention will be better understood after reading the following description accompanied by the appended drawings, in which:

FIG. 1 is a sectional view on a plane passing through the axis of the rotation shaft of the rotor of the electric motor of a gear motor in which the axial locking of the bearing guiding the rotation shaft at the electric motor end is produced by an elastic ring (such as circlip®) forming a stop ring for the inner race of the bearing disposed inside the hollow support and in accordance with an embodiment that does not conform to the invention, FIG. 2 is a partial view of the gear motor from FIG. 1 showing diagrammatically the axial locking of the bearing by said elastic ring in accordance with the embodiment that does not conform to the invention, FIG. 3 is a partial view showing diagrammatically an embodiment of the invention in which the axial locking of the inner race of the bearing on the rotation shaft is produced, on the one hand, by the axial locking of the hollow support thanks to an elastic ring (such as circlip®) received in a groove in the shaft forming a stop ring for the hollow support and by fitting a tubular spacer bearing at one of its ends on the inner race of the bearing and at the other end on the internal wall of said hollow support, FIG. 4 is a partial view of a second embodiment of the invention which differs from that from FIG. 3 in that the axial locking of the hollow support onto the rotation shaft is produced by welding, FIG. 5 is a partial view according to a third embodiment of the invention that differs from that from FIG. 3 in that the axial locking of the hollow support onto the rotation shaft is obtained by locking a multipole magnet itself constituting an abutment for the sleeve of the hollow support, FIG. 6 is a partial view according to a fourth embodiment in which the inner race of the bearing bears directly on the internal wall of said hollow support.

Thus the invention concerns a gear motor 1 for motor vehicle wiper systems including:

an electric motor 2, for example a brushless DC motor, including:

a rotor 20 carrying magnetic elements, such as permanent magnets, a stator 21 including windings for electromagnetic excitation of the rotor, a rotation shaft 22 fastened to the rotor, a reduction mechanism 3 connecting the rotation shaft 22 and an output shaft 8 of the gear motor.

A casing 4 can form a protective envelope for the electric motor 2 and said reduction gear mechanism 3. If the electric motor is a brushless DC motor, a gear motor of this kind includes a device for determining the angular position of the rotor 20 relative to the stator 21. A controller (not shown) is configured to generate control signals to supply the electromagnetic excitation windings of the stator 21 with power as a function of the angular position of the rotor determined by the device for determining the angular position of the rotor.

In accordance with one embodiment, the device for determining the angular position of the rotor may include a multipole magnet 5 constrained to rotate with the rotor and one or more Hall-effect sensors (not shown) at fixed positions adapted to detect changes of the magnetic domains of the multipole magnet when the rotor rotates.

In accordance with one embodiment, the reducing mechanism 3 may include a system comprising a worm 30 and a worm wheel 31, the worm fastened to the rotation shaft 22 of the rotor 20, the worm wheel 31 fastened to the output shaft of the gear motor. That output shaft is substantially perpendicular to the rotation shaft 22 of the electric motor 2. The thread of the worm 30 may be in one piece with the rotation shaft 22, which is typically made of metal.

A bearing 23 guides the rotation shaft 22 at the electric motor longitudinal end of the rotation shaft. In particular, this bearing 23 is disposed inside the combination of the rotor 20 and the stator 21 and housed in an internal recess in the rotor 20. This end of the rotation shaft can therefore and advantageously be guided by the bearing 23 without necessitating a shaft length such that its end projects beyond the rotor, as in accordance with the Applicant's prior art.

On the other hand, mounting this bearing 23 inside the rotor does not necessitate disposing the bearing surface on the usable length section of the rotation shaft outside the rotor and already used to support the worm and/or to support the multipole magnet 5: this length section of the shaft outside the rotor may be minimized with the aim of increasing the compactness of the gear motor in that direction.

To this end, a hollow support 25 carries said magnetic elements 29 on its circumference and is arranged coaxially with and constrained to rotate with the rotation shaft 22: this hollow support 25 advantageously comes to cap said bearing 23 that guides the electric motor 2 longitudinal end of the rotation shaft 22.

This hollow support 25 may further extend axially beyond the electric motor longitudinal end of the rotation shaft 22. This in particular makes it possible to dispose said magnetic elements 29 of the rotor at least partly beyond the longitudinal end of the rotation shaft 22 and as shown for example in FIG. 3. This hollow support is for example a circular body that includes a tubular hollow part with an inside diameter enabling the bearing 23 to be housed inside it, or even a projecting part 40 of the casing 4 the function of which is described hereinafter.

This hollow support 25 may further include a sleeve 26 for fixing the hollow support 25 to the rotation shaft 22. This sleeve 26 comes to be fixed in an intermediate position on the rotation shift 22 between the reduction gear mechanism 3 and the bearing 23. The inside diameter of the sleeve 26 may be adjusted to suit the outside diameter of the rotation shaft in this intermediate position. This may be a tight fit enabling assembly by shrinking the hollow support 25 onto said rotation shaft 22. This sleeve 26 may again be adhesively bonded to the shaft 22.

Note that the multipole magnet 5 may take the form of a ring mounted around the rotation shaft. The (north/south) magnetic domains extend in an alternating manner around the circumference of the ring. This multipole magnet 5 may be fastened to said hollow support 25 and arranged around said fixing sleeve 26 of said hollow support 25.

Said hollow support 25 includes a length section 27 to support the magnetic elements 29. This support length section 27 is substantially cylindrical. The magnetic elements 29 of the rotor are fastened to the external wall of the cylinder. A shoulder 28, in particular in the form of a ring, may extend radially outward at the distal end of said support length section 27 for the magnetic elements. This shoulder 28 forms a lateral abutment for said magnetic elements 29 of the rotor 20. This shoulder 28 facilitates alignment of the magnetic elements along the same diametral line.

Note further that the hollow support 25 has a connection length section connecting the sleeve 26 and said cylindrical support length section 27, which has a greater diameter than the sleeve 26. This connecting section may have vent openings distributed angularly about the rotation axis, enabling circulation of air through said hollow support, in particular to enable cooling of the bearing 23.

The hollow support 25 may essentially consist of a one-piece element, in particular a sheet metal plate shaped to constitute successively the sleeve 26, the connecting section, the cylindrical support section 27, and even said shoulder 28.

The envelope of the casing 4 may include said projecting part 40 directed toward the interior of the casing 4. As FIG. 2 shows, this projecting part 40 penetrates into said recess inside the rotor 20 and supports a seat 41 for said bearing 23. This projecting part 40 is capped by the hollow support 25, at least by said cylindrical support length section 27. The projecting part 40 may include a tubular wall 47 extending coaxially with the rotation shaft 22, the seat 41 for the bearing being formed at the distal end of the projecting part 40 by a housing for the bearing 23.

The housing may be defined by the cylindrical inside surface of the tubular wall 47 and a shoulder 48 extending radially inward from the cylindrical surface. The bearing 23 comprises an outer race, an inner race and rolling elements such as balls, and the seat 41 of the casing 4 may have a diameter adjusted to suit the outer race of the bearing 23. Note further that the wall forming a shoulder may be extended to block completely the recess of the projecting part, where appropriate by forming an extra depth cavity of the housing for the bearing 23: this extra depth cavity of the housing is intended to receive part of the end of the rotation shaft protruding slightly from the bearing 23.

In accordance with one embodiment, the casing 4 may include, on the one hand, an envelope part 44, in particular of cylindrical shape, receiving at least the rotor 20 and the stator 21 of the electric motor 2, having an opening to the side of the electric motor 2, and, on the other hand, a closing flange 43 removably closing said lateral opening. In accordance with one embodiment, said projecting part 40 of the casing 4 may be carried by the closing flange 43. The envelope part 44 may be a base, in particular made of metal, having fins 46 intended to facilitate the evacuation of heat.

If the closing flange 43 is removed, the lateral opening allows removal of the components of the electric motor such as the rotor 20, the stator 21, the rotation shaft 22 and the hollow support 25 in particular. This closing flange 43 may include a wall 50 of disk shape extending laterally of the stator and rotor assembly and having a peripheral rim coming to cooperate in sealed manner with a complementary edge of said lateral opening. Said projecting part 40 extends from this disk-shaped wall toward the interior of the internal recess. This disk-shaped wall and the projecting part 40 of the closing flange 43 may consist of a one-piece element, in particular made of metal.

The closing flange 43 may be held against the part 44 by means of fixing members passing through lugs on the closing flange 43 and typically screwed into threaded bores in the envelope part 44.

In accordance with one embodiment, the rotation shaft 22 may be guided in rotation entirely by two bearings 23, 24 arranged at the two longitudinal ends of the rotation shaft 22, namely, on the one hand, said bearing 23 at the electric motor end, capped by the hollow support 25, or even carried by the seat 41 of the projecting part 40, and, on the other hand, another bearing 24 at the other, reduction gear mechanism 3 longitudinal end of the rotation shaft 22.

Note that the diameter of the rotation shaft 22 at the level of the longitudinal ends supported by the two bearings 23, 24 may be greater than the diameter of the shaft at the level of the worm 30. It is therefore possible to increase the resistance to bending of the rotation shaft 22 by a moderate increase in the diameter of the rotation shaft. Satisfactory operation of the reduction gear mechanism is still obtained, in particular with no risk of gear stripping between the worm 30 and the worm wheel 31 of the reduction gear mechanism worm gear, while the rotation shaft is guided in rotation without any guide bearing on a central portion of the shaft.

Each bearing 23 or 24 includes an outer race, an inner race and rolling elements such as balls. At each longitudinal end of the rotation shaft the inner race of the corresponding bearing 23 (or 24) may have an inside diameter adjusted to suit the outside diameter of the shaft at the level of the corresponding longitudinal end.

A second seat 42 having a diameter adjusted to suit the outer race receives the bearing 24 guiding the other, reduction gear mechanism 3 longitudinal end of the rotation shaft 22.

Here the invention nevertheless addresses the axial locking of the position of the bearing 23 on the rotation shaft 22. The example from FIG. 1 shows one locking possibility that does not form part of the invention, represented diagrammatically in FIG. 2: locking is provided in the conventional manner by an elastic ring 6 (such as a circlip®) received in a groove in the shaft and forming a stop ring for the inner race of the bearing 23, the stop ring situated on the side opposite the side of the bearing that bears on the seat 41.

The elastic ring 6, termed the first elastic ring, is received in a first groove in the rotation shaft 22 and can enable locking of the position of the bearing 23 in the corresponding seat 41 of the casing 4. A second elastic ring 7 received in a groove in the rotation shaft 22 can enable locking of the axial position of the other bearing 24 in the other seat 42 of the casing 4. The interior sides of the two elastic rings 6 and 7 may respectively abut against the two bearings 23 and 24 in order to prevent them moving toward one another on the rotation shaft 22 by locking the axial position of each bearing on the axis.

Although fitting the elastic ring 7 causes no particular difficulty, it is clear that fitting the elastic ring 6 is difficult in that it has to be fitted onto the rotation shaft 22 and in particular inside the cavity of the hollow support 25.

The invention advantageously enables this problem to be addressed by proposing a solution for locking the axial position of the bearing 23 on the rotation shaft 22 inside the hollow support 25 that is easy to industrialize. Different variants of this solution are shown by way of illustration in FIGS. 2 to 6.

According to the invention, the axial position of the bearing 23 on the rotation shaft 22 is locked by axially locking said hollow support 25 onto the rotation shaft 22, on the one hand, and by the inner race of the bearing 23 bearing on an internal wall of said hollow support 25, on the other hand, on the side of the bearing 23 opposite that engaging with said seat 41.

In accordance with the invention, the support provided by the hollow support 25 on the inner race of the bearing 23 exerts a reaction force that comes to oppose the forces F of the seat 41 on the outer race of said bearing 23.

To this end, said inner race of the bearing 23 may bear directly on the internal wall of said hollow support 25, as shown by way of illustration in FIG. 6. Note that the inner race of the bearing 23 bears directly on the internal wall of said hollow support 25 consisting of said connection length section connecting the sleeve 26 and said cylindrical support length section 27.

To this end, and in particular, said connection length section is advantageously shaped so as not to touch the outer race of said bearing 23 (when the inner race of the bearing 23 bears on that part).

In accordance with another embodiment shown by way of illustration in FIGS. 3 to 5, the inner race of the bearing 23 may bear indirectly on the internal wall of the hollow support 25 via a spacer 8 inside said hollow support 25, said spacer 8 bearing respectively on said inner race and the internal wall of the hollow support 25.

Said spacer 8 may be a tubular element, such as a washer, through which the rotation shaft passes.

In accordance with the invention, the object of axially locking said hollow support 25 on the rotation shaft 22 is to oppose movement of said hollow support 25 away from said seat 41.

The hollow support 25 may be axially locked onto the rotation shaft 22 by an elastic ring 9 such as circlip® received in a groove in the rotation shaft 22 bearing on the hollow support 25 either directly or indirectly via a spacing part 10. The elastic ring then constitutes an abutment for said hollow support 25 opposing movement of said hollow support 25 away from said seat 41.

For example, and in accordance with the example from FIG. 3, the elastic ring 9 constitutes a stop ring for the hollow support 25 in direct contact with the distal end of the sleeve 26 and opposing movement of said hollow support 25 away from the seat 41.

In accordance with the example from FIG. 5 the elastic ring 9 received in a groove in the rotation shaft 22 bears on an intermediate part 10, such as the multipole magnet 5 for example, that is itself in contact with the hollow support 25, in particular with the distal end of the sleeve 26: this elastic ring 9 constitutes a stop ring that opposes movement of said hollow support 25 away from the seat 41.

In accordance with another embodiment that is not shown said hollow support 25 is axially locked onto the rotation shaft 22 by a bead bearing on the hollow support 25 either directly or indirectly via a spacing part 10. This bead is in one piece with the rotation shaft and constitutes an abutment for said hollow support opposing movement of said hollow support away from said seat 41. This bead may be produced by the manufacturing techniques known as "rolling".

In accordance with another embodiment shown by way of example in FIG. 4, said hollow support 25 is axially locked onto the rotation shaft 22 by welding said hollow support 25 to the rotation shaft 22. The welding may be laser or other welding, carried out in particular between the fixing sleeve 26 and the rotation shaft 22.

The hollow support 25 may be shrunk onto the rotation shaft 22, in particular by shrinking said sleeve 26 onto the rotation shaft 22. This shrinking may be sufficient in itself to achieve the axial locking of said hollow support 25. In accordance with another alternative, the axial locking is obtained in combination with one of the solutions described above, in particular welding said hollow support to the rotation shaft, adding an elastic ring 9, or the presence of a bead in one piece with the rotation shaft.

In accordance with one embodiment, said hollow support is axially locked onto the rotation shaft 22 by axially locking said multipole magnet 5 onto the rotation shaft 22 and by said hollow support 25 bearing on said multipole magnet 5.

In accordance with this embodiment, said multipole magnet 5 constitutes an abutment for said hollow support 25 opposing movement of said hollow support away from said seat 41.

In accordance with this embodiment, the multipole magnet 5 may be axially locked onto the rotation shaft 22 by an elastic ring 9 received in a groove in the rotation shaft (see FIG. 5), or again by the formation of a bead in one piece with the rotation shaft, said elastic ring or the bead constituting an abutment for said multipole magnet 5 opposing movement of said hollow support away from said seat 41.

Furthermore, the multipole magnet 5 may be axially locked onto the rotation shaft 22 by welding said multipole magnet 5 to the rotation shaft 22 or by shrinking said multipole magnet 5 onto the rotation shaft 22.

The invention finds one particular application in a motor vehicle wiper system including one or more wiper blades, a linkage mechanism for driving the wiper blade or blades with a to-and-fro movement, and a gear motor according to the invention the output shaft which drives the linkage mechanism.

In a system of the above kind the continuous movement in rotation of the output shaft is converted by the linkage mechanism into a to-and-fro movement of the wiper blade or blades.

PARTS LIST 1 gear motor,
2 electric motor,
20 rotor,
21 stator,
22 rotation shaft,
23, 24 bearings,
25 hollow support,
26 fixing sleeve (hollow support 25),
27 rotor magnetic element support length section (hollow support 25),
28 shoulder,
29 magnetic elements of rotor (i.e. permanent magnets),
3 reduction gear mechanism,
30 worm,
31 worm wheel,
4 casing,
40 projecting part,
41, 42 seats (bearings),
43 closing flange,
44 envelope part (base),
46 fins (base),
47 tubular wall (projecting part 40),
48 shoulder,
5 multipole magnet,
6, 7 elastic means (stop rings for bearings),
8 spacer,
9 elastic ring (stop ring for hollow support 25)
10 spacing part.

The invention claimed is:

1. A gear motor for a motor vehicle wiper system, comprising:
an electric motor including:
a rotor including magnetic elements,
a stator including windings for electromagnetic excitation of the rotor,
a rotation shaft fastened to the rotor, the rotation shaft having longitudinal ends including an electric motor longitudinal end and a reducing mechanism longitudinal end,
a reduction mechanism connecting the rotation shaft and an output shaft of the gear motor,
wherein a bearing guides the rotation shaft at one of the longitudinal ends of the rotation shaft, having an outer race and an inner race mounted on the rotation shaft,
said bearing, disposed inside a combination of the rotor and the stator, being housed in an internal recess in the rotor, and in which a hollow support carries said magnetic elements and is arranged coaxially with the rotation shaft, said hollow support coming to cap said bearing guiding the electric motor longitudinal end of the rotation shaft, and
wherein said bearing is received in a fixed seat having a bearing face engaging with the outer race of the bearing, on a first side of two sides of the bearing, the axial position of the bearing on the rotation shaft being locked by axially locking said hollow support onto the rotation shaft, and by the inner race of the bearing bearing on an internal wall of said hollow support, on a second side of the two sides of the bearing,
said inner race of the bearing bearing on the internal wall of said hollow support either directly or indirectly via a spacer inside said hollow support, said spacer bearing on said inner race and the internal wall of the hollow support,
wherein the hollow support includes:
a sleeve for fixing the hollow support onto the rotation shaft in an intermediate position on the rotation shaft between the reduction gear mechanism and the bearing guiding the electric motor longitudinal end of the rotation shaft,
a substantially cylindrical support length section to a circumference of which the magnetic elements of the rotor are fastened, and
a connection length section connecting the sleeve and said cylindrical support length section,
wherein the internal wall of the hollow support consists of the connection length section connecting the sleeve and said cylindrical support length section, and
wherein the rotor, the hollow support, the sleeve, the substantially cylindrical support length section, the connection length section, the magnetic elements, and the bearing are constrained to jointly rotate with the rotation shaft relative to the stator.

2. The gear motor as claimed in claim 1, wherein the inner race of the bearing bears indirectly on the internal wall of said hollow support via said spacer, said spacer being a tubular element through which the rotation shaft passes.

3. The gear motor as claimed in claim 1, wherein the axial locking of said hollow support onto the rotation shaft is obtained by welding said hollow support onto the rotation shaft.

4. The gear motor as claimed in claim 1, wherein the axial locking of said hollow support onto the rotation shaft is produced by an elastic ring received in a groove in the rotation shaft and bearing on the hollow support either directly or indirectly via a spacing part, said elastic ring constituting an abutment for said hollow support opposing movement of said hollow support away from said seat.

5. The gear motor as claimed in claim 1, wherein the axial locking of said hollow support onto the rotation shaft is produced by a bead bearing on the hollow support either directly or indirectly via a spacing part, said bead being in one piece with the rotation shaft and constituting an abutment for said hollow support opposing movement of said hollow support away from said seat.

6. The gear motor as claimed in claim 1, in which the hollow support is shrunk onto the rotation shaft.

7. The gear motor as claimed in claim 1, wherein a device for determining the angular position of the rotor includes a multipole magnet constrained to rotate with the rotor and one or more Hall-effect sensors and in which the axial locking of said hollow support onto the rotation shaft is produced by axially locking said multipole magnet onto the rotation shaft and by said hollow support bearing on said multipole magnet, said multipole magnet constituting an abutment for said hollow support opposing movement of said hollow support away from said seat.

8. The gear motor as claimed in claim 7, in which the axial locking of the multipole magnet onto the rotation shaft is produced by an elastic ring received in a groove in the rotation shaft or by a formation of a bead in one piece with the rotation shaft, said elastic ring or the bead constituting an abutment for said multipole magnet opposing movement of said hollow support away from said seat.

9. The gear motor as claimed in claim 7, in which the axial locking of the multipole magnet onto the rotation shaft is produced by welding said multipole magnet onto the rotation shaft or by shrinking said multipole magnet onto the rotation shaft.

10. The gear motor as claimed in claim 1, in which the inner race of the bearing bears directly on the internal wall of said hollow support consisting of said connection length section connecting the sleeve and said cylindrical support length section, said connection length section being formed so as not to touch the outer race of said bearing.

11. The gear motor as claimed in claim 1, wherein the sleeve, said substantially cylindrical support length section, and said connection length section connecting the sleeve and said cylindrical support length section consist of a one-piece element such as a shaped sheet metal plate.

12. The gear motor as claimed in claim 1, in which said hollow support extends axially beyond the electric motor longitudinal end of the rotation shaft.

13. The gear motor as claimed in claim 1, in which, a casing forming a protective envelope for the electric motor and said reduction gear mechanism, said envelope of the casing includes a part projecting inward, penetrating into said internal recess in the rotor, and supporting said seat for said bearing, and in which said hollow support comes to cap said projecting part of the casing.

14. The gear motor as claimed in claim 1, in which the rotation shaft is guided in rotation only by two bearings arranged at the two longitudinal ends of the rotation shaft, including said bearing capped by said hollow support and another bearing at the reducing mechanism longitudinal end of the rotation shaft.

* * * * *